United States Patent
Schwartz et al.

(10) Patent No.: US 10,781,008 B2
(45) Date of Patent: Sep. 22, 2020

(54) ROTARY CUP FILLER

(71) Applicant: Spee-Dee Packaging Machinery, Inc., Sturtevant, WI (US)

(72) Inventors: Joshua A. Schwartz, Kenosha, WI (US); Ron J. Kuemper, Milwaukee, WI (US)

(73) Assignee: Spee-Dee Packaging Machinery, Inc., Sturtevant, WI (US)

( * ) Notice: Subject to any disclaimer, the term of this patent is extended or adjusted under 35 U.S.C. 154(b) by 248 days.

(21) Appl. No.: 15/805,630

(22) Filed: Nov. 7, 2017

(65) Prior Publication Data

US 2018/0127130 A1 May 10, 2018

Related U.S. Application Data

(60) Provisional application No. 62/497,068, filed on Nov. 7, 2016.

(51) Int. Cl.
| | |
|---|---|
| *B65B 43/60* | (2006.01) |
| *B65B 43/50* | (2006.01) |
| *B65G 47/84* | (2006.01) |
| *B65G 29/00* | (2006.01) |
| *B65B 1/06* | (2006.01) |

(52) U.S. Cl.
CPC .............. *B65B 43/60* (2013.01); *B65B 43/50* (2013.01); *B65G 29/00* (2013.01); *B65G 47/846* (2013.01); *B65B 1/06* (2013.01)

(58) Field of Classification Search
CPC ...... B65G 47/846; B65G 29/00; B65B 43/50; B65B 43/60; B67D 2210/00076
See application file for complete search history.

(56) References Cited

U.S. PATENT DOCUMENTS

| 1,502,201 | A | * | 7/1924 | Jaeger | B65B 43/50 |
| | | | | | 198/461.2 |
| 2,262,685 | A | * | 11/1941 | Kronquest | B65B 31/00 |
| | | | | | 53/510 |
| 3,915,207 | A | * | 10/1975 | Greenfield, Jr. | A47J 31/401 |
| | | | | | 141/82 |
| 2003/0106779 | A1 | * | 6/2003 | Stocchi | B65G 29/00 |
| | | | | | 198/803.3 |
| 2012/0175224 | A1 | * | 7/2012 | Briggs | B65G 47/846 |
| | | | | | 198/478.1 |

OTHER PUBLICATIONS

Spee-Dee Packaging Machinery, Inc., Servo Cup Filler,. pp. 1-2, dated prior to Nov. 7, 2016.

* cited by examiner

*Primary Examiner* — Timothy P. Kelly
(74) *Attorney, Agent, or Firm* — Boyle Fredrickson S.C.

(57) ABSTRACT

A rotary cup filler has a cup holder plate that permits cup holders to be retained in place by inserting them into open-ended receptacles from the side of the cup holder plate rather than being inserted into openings in the bottom cup holder plate from beneath. In one configuration, the cup holder plate has a central hub and plurality of arms that extend arcuately from the central hub to form the receptacles therebetween. The arms may engage opposed sides of a circumferential groove in the associated cup holder.

18 Claims, 10 Drawing Sheets

Prior Art

ROTARY CUP FILLER

CROSS REFERENCE TO RELATED APPLICATIONS

This application claims priority under 35 USC § 1.119(e) to earlier U.S. Provisional Patent Application Ser. No. 64/497,068, filed Nov. 7, 2016 and entitled ROTARY CUP FILLER, the contents of which are incorporated by reference in their entirety.

BACKGROUND OF THE INVENTION

1. Field of the Invention

The invention generally relates to the field of rotary filling machines for dispensing controlled volumes of dry products and, more particularly, relates to a rotary cup filling machine having an improved cup holder and cup holder plate arrangement.

2. Discussion of the Related Art

Rotary filling machines are routinely used for dispensing dry products into receiving containers. One such machine is a "rotary cup filler," sometimes referred to as a "volumetric rotary cup filler" or a "pocket filler", for dispensing granular materials or particles of small to intermediate size, such as pet food, nuts, coffee beans, etc. Rotary cup fillers can be used to dispense materials into containers at a rate of tens to hundreds of containers per minute.

The typical rotary cup filler includes an upper feed hopper, a lower discharge such as a dispensing funnel, and a carousel or turret assembly located vertically between the feed hopper and the discharge and supporting a number of cups. The turret assembly includes upper and lower cup holder plates that are disposed one above the other and that are driven to rotate by a common driven shaft. Vertically aligned through-holes are formed in the upper and lower bottom cup holder plates, and open-ended cylinders or "cups" extend between the cup holder plates and into the openings for receiving product to be dispensed. The ends of each cup are in each case received in or formed by a cup holder (sometimes known as a cup holder insert) that is retained in the associated opening in the cup holder plate. Bottom surfaces of the bottom cup holders are supported on and slide over a stationary wear plate, which has a lower opening that is offset in the direction of turret rotation from the feed hopper and which is in alignment with the dispensing funnel or other discharge.

In operation, products to be dispensed are fed into the feed hopper and flow into an underling cup through one of the openings in the upper cup holder plate. Filling the cup to the top surface of the upper cup holder plate stores a predetermined volume of goods in the cup as the cup rotates around the rotary cup filler. After each cup is filled, it rotates to the far side of the rotary cup filler, where its contents are emptied into the underlying dispensing hopper through the opening in the bottom cup holder plate and the opening in the wear plate. The volume then is discharged into a package or other container. The now-empty cup then rotates back to a position underneath the feed hopper, and the process is repeated.

Figure 12:
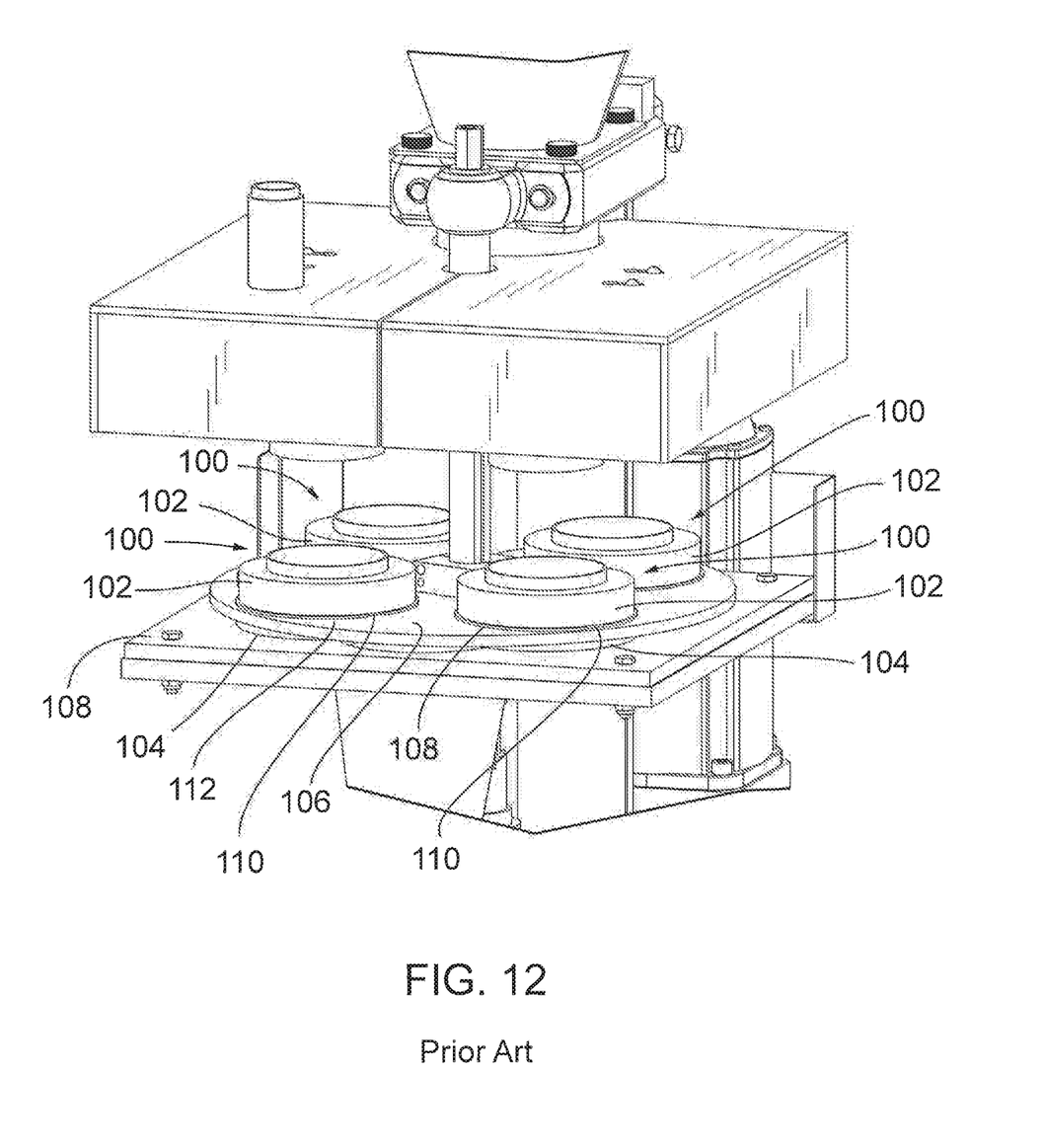
FIG. 12 is a perspective view of a portion a rotary cup filler fitted with a cup holder and cup holder plate assembly constructed in accordance with the prior art and is appropriately labeled "PRIOR ART".

Referring to FIG. 12, the bottom cup holders 100 of the typical rotary cup filler are stepped so as to have a reduced diameter upper portion 102 that extends through the corresponding hole in the bottom cup holder plate 106 and an increased diameter lower annular shoulder 104 that supports the rotating cup holder plate 106 on the stationary wear plate 10. A retaining ring 110 snaps into a groove 112 in the bottom cup holder 100 located above the bottom cup holder plate 106 to hold the bottom cup holder 100 in position during initial assembly and to inhibit cup holder movement relative to the bottom cup holder plate 106 during operation.

Cup holders periodically must be replaced when they become worn or damaged, and/or in order to replace them with cup holders of different inner diameters in order to alter the volumetric capacity of the cups. In the past, this replacement was a rather time-consuming and labor-intensive process. The snap ring located above the bottom cup holder plate had to be removed from the corresponding retaining groove in the bottom cup holder. In addition, the bottom cup holder plate had to be lifted a substantial distance above the underlying wear plate to permit the bottom cup holder to be dropped through the corresponding opening in the bottom cup holder plate from above and removed from the resulting gap between the bottom cup holder plate and the wear plate. Since cups may have a height of several inches or more, the resulting lifting requirement places substantial burden on maintenance personnel.

The need therefore has arisen to provide a simplified mechanism and process for replacing a bottom cup holder of a rotary cup filler.

The need additionally has arisen to reduce the number of parts required for retaining a bottom cup holder of a rotary cup filler on a bottom cup holder plate.

BRIEF DESCRIPTION

In accordance with a first aspect of the invention, one or more of the above-identified needs is met through the provision of a rotary cup filler having a cup holder plate that permits cup holders to be retained in place by inserting them into open receptacles from the side of the cup holder plate rather than being inserted into circular openings in the cup holder plate from beneath. In one configuration, the cup holder plate has a central hub and a plurality of arms that extend arcuately from the central hub to form open-ended receptacles therebetween for receiving the cup holders. In one configuration, each receptacle is formed in the space between a pair of adjacent arms, and the arms engage opposed sides of a circumferential groove in the associated cup holder.

Each of the cup holders could removably receive the bottom of an associated cup or could itself form the bottom portion of an associated cup.

In one configuration, the arms of the cup holder plate curve or sweep in the direction of cup holder plate rotation so that forces imposed on the cup holders during cup holder plate rotation tend to retain the cup holders in the receptacles.

In one configuration, each cup holder engages the opposed arm edges bordering each receptacle with an interference fit or even a snap-fit between the cup holder and the arms to securely retain the cup holder in the receptacle.

In one configuration, the portion of the receptacles that engages the associated cup holder are semi-circular in shape to receive the one-piece cylindrical cup holders.

In one configuration, the central hub is configured to receive a driven shaft for rotation of the cup holder plate to receive dispensed materials from the feed hopper and to discharge the materials form the cup into the underlying package or container.

In one configuration, the plurality of arms includes at least four arms to accommodate at least four cup holders.

In one configuration, a cup holder is usable with the cup holder plate described above.

The resulting cup holder plate locates cup holders precisely, but allows for cup holder removal without opening the machine up as far as needed with previous designs. Because the cup holders are held in the cup holder plate, retaining rings that otherwise would be required can be eliminated. The cup holder plate can be used with new machines or as a drop-in upgrade to existing machines. It also offers greater flexibility and easier changeover than prior cup holder plates.

In accordance with a second aspect of the invention, one or more of the above-identified needs is met through the provision of a rotary cup filler configured to fill cups of a designated volumetric capacity with materials and to discharge the materials from the cups. The rotary cup filler includes a frame, a feed hopper supported by the frame and configured to dispense a material, a cup holder plate, and a cup holder. The cup holder plate is supported by the frame and comprises a central hub and a plurality of arms that extend arcuately from the central hub to form open-ended receptacles therebetween. Each cup holder has a mating portion that is received within a corresponding receptacle in the cup holder plate and that is configured to receive the dispensed material from the feed hopper. A drive motor is supported by the frame and communicates with the cup holder plate to drive rotation of the cup holder plate.

In one embodiment, a diameter of the receptacle is larger than an inner diameter of the mating portion of the cup holder by 0.005" to 0.015". In one embodiment, the arms engage opposed sides of a circumferential groove in the associated cup holder to provide a snap-fit or interference fit into the receptacle while leaving sufficient material outboard of the groove to provide adequate strength to retain the cup holder on the cup holder plate.

Also disclosed is a method of attaching a cup holder to a cup holder plate of a rotary cup filler by inserting the cup holder into an open-ended receptacle of the cup holder plate from a side of the cup holder plate.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION

Figure 1:
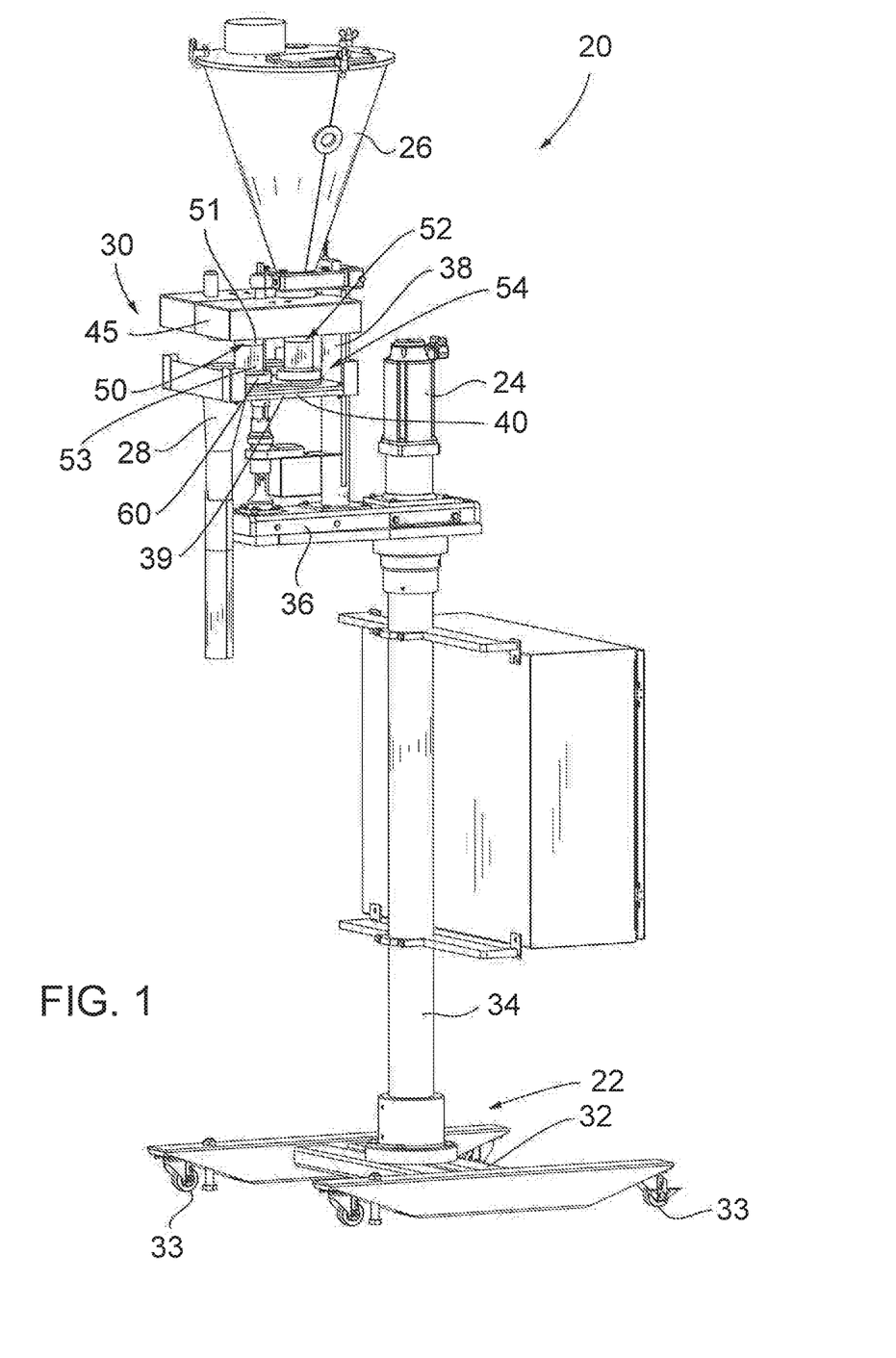
FIG. 1 is a perspective view of a rotary cup filler with which a bottom cup holder plate constructed in accordance with the present invention is usable.

Turning initially to FIG. 1, a rotary cup filling machine or "rotary cup filler" 20 that can be fitted with a cup holder and cup holder plate assembly constructed in accordance with the invention is illustrated. The rotary cup filler 20 is designed to fill hollow cylinders or "cups" of a designated volumetric capacity with materials and to discharge the materials from the cups into underlying containers or packages. Cup fillers of this general type sometimes are referred to as "volumetric cup fillers" or "pocket fillers." The illustrated rotary cup filler 20 includes a frame 22 which may be stationary or mounted on wheels or casters, a drive motor 24, a feed hopper 26, a dispensing funnel 28, and a rotary turret or carousel 30. The frame 22 includes a base 32 that, in this embodiment, is rotatably supported on casters 33, a main pedestal 34 supported on the base 32, a support platform 36 mounted on top of the main pedestal 34, and a turret support pedestal 38 mounted on the support platform 36. The turret 30, the feed hopper 26, the dispensing funnel 28, a support plate 39, and a wear plate 40 are mounted on the turret support platform 36. The wear plate 40 has an opening 61 (FIGS. 2 and 4) in alignment with an underlying opening 63 in the support plate 39 and with the inlet of the dispensing funnel 28. The wear plate 40 may be made of an abrasion-resistant material that has a relatively low coefficient of sliding friction. It also may be desirable to make it easily cleanable. Stainless steel or UHMW are examples of acceptable materials.

Figure 2:
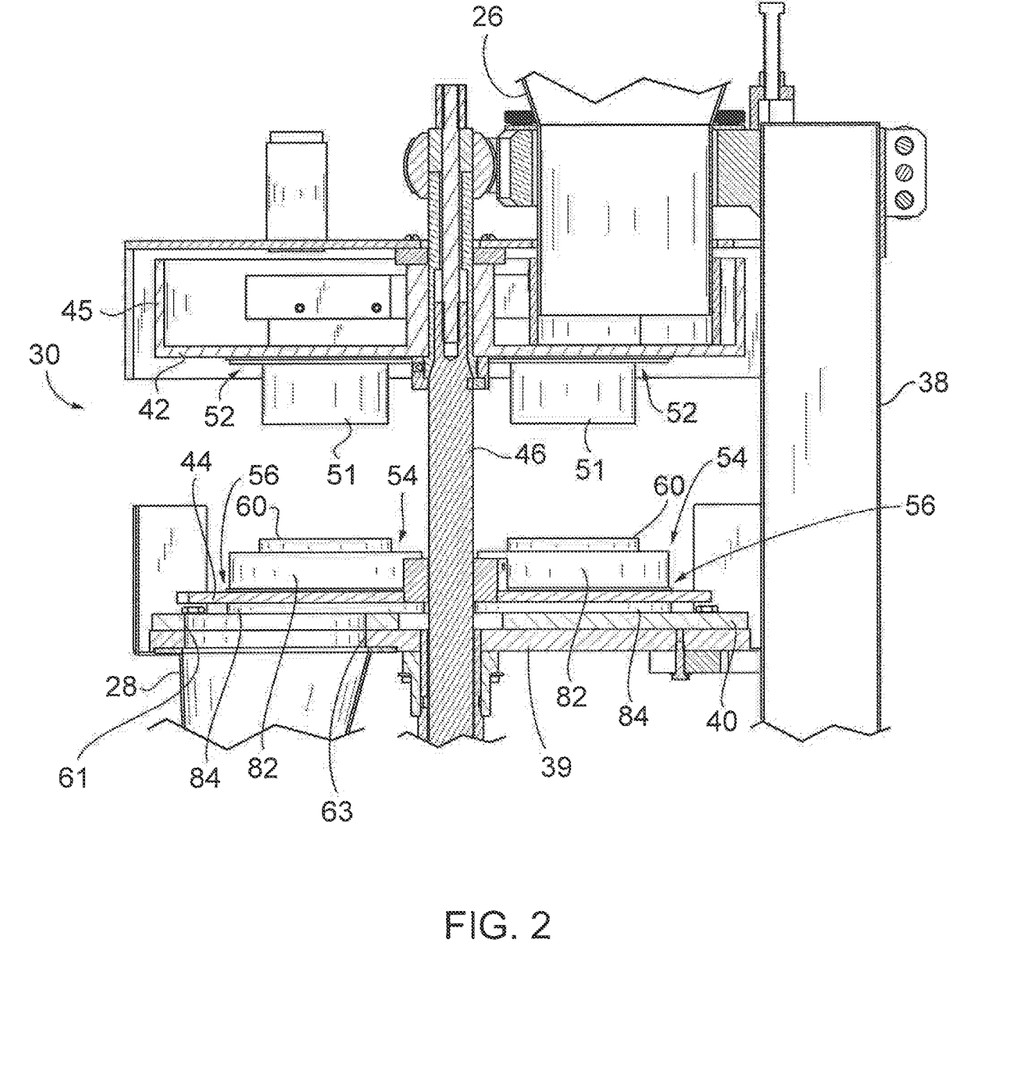
FIG. 2 is a sectional side elevation view of the rotary cup filler of FIG. 1.

Referring now to FIGS. 1-2, the turret assembly 30 includes upper and lower cup holder plates 42 and 44 connected by a common driven shaft 46 so as to rotate together. The shaft 46 is driven by motor 24. A wall 45 may extend upwardly from the periphery of the top cup holder plate 42 to prevent materials from falling off the edge of the top cup holder plate 42. A number of apertures 48 are formed through the top cup holder plate 42 that serve as receptacles for receiving the upper ends of cups 50 (FIG. 4). The bottom cup holder plate 44 receives the bottom ends of cups 50 (FIG. 3) or 51' (FIG. 4) as described below.

Figure 3:
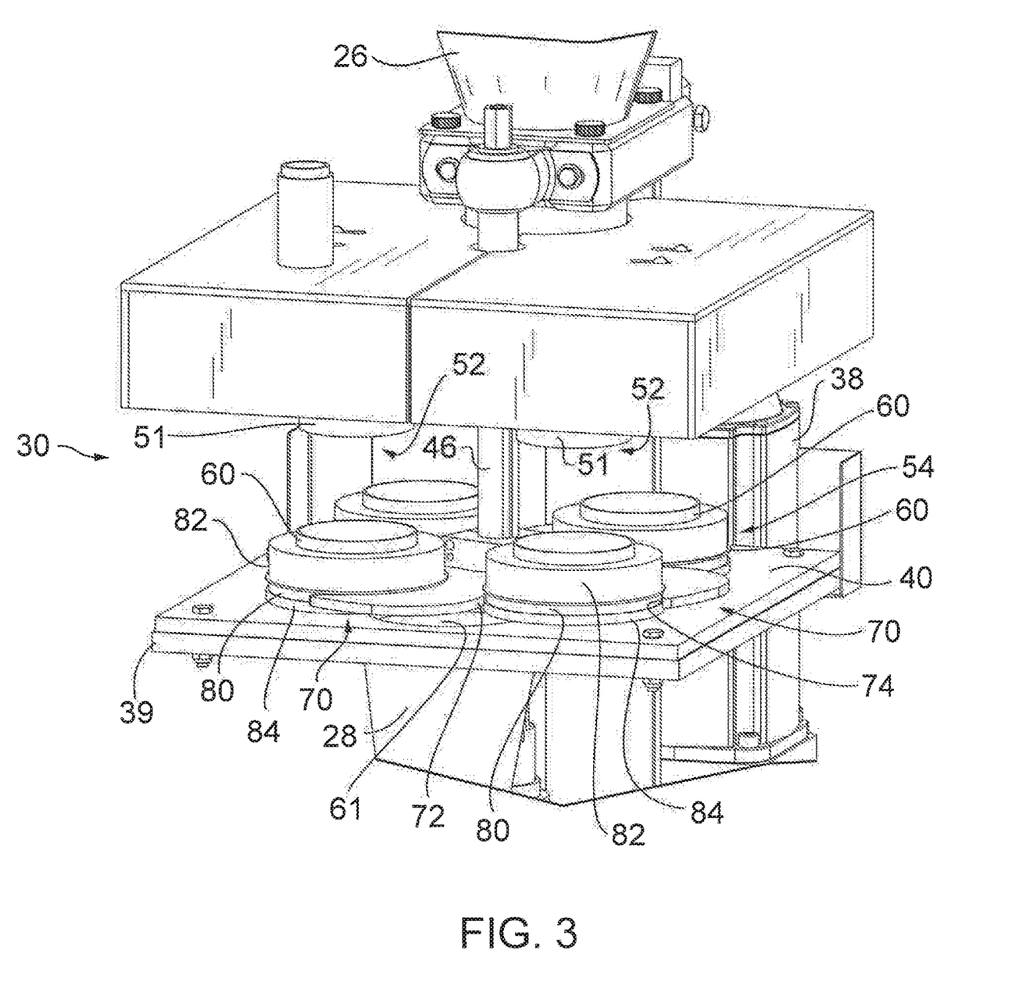
FIG. 3 is a fragmentary isometric view of a portion of the rotary cup filler of FIGS. 1-2 including an assembly formed by the bottom cup holders and the bottom cup holder plate of the rotary cup fuller.
Figure 4:
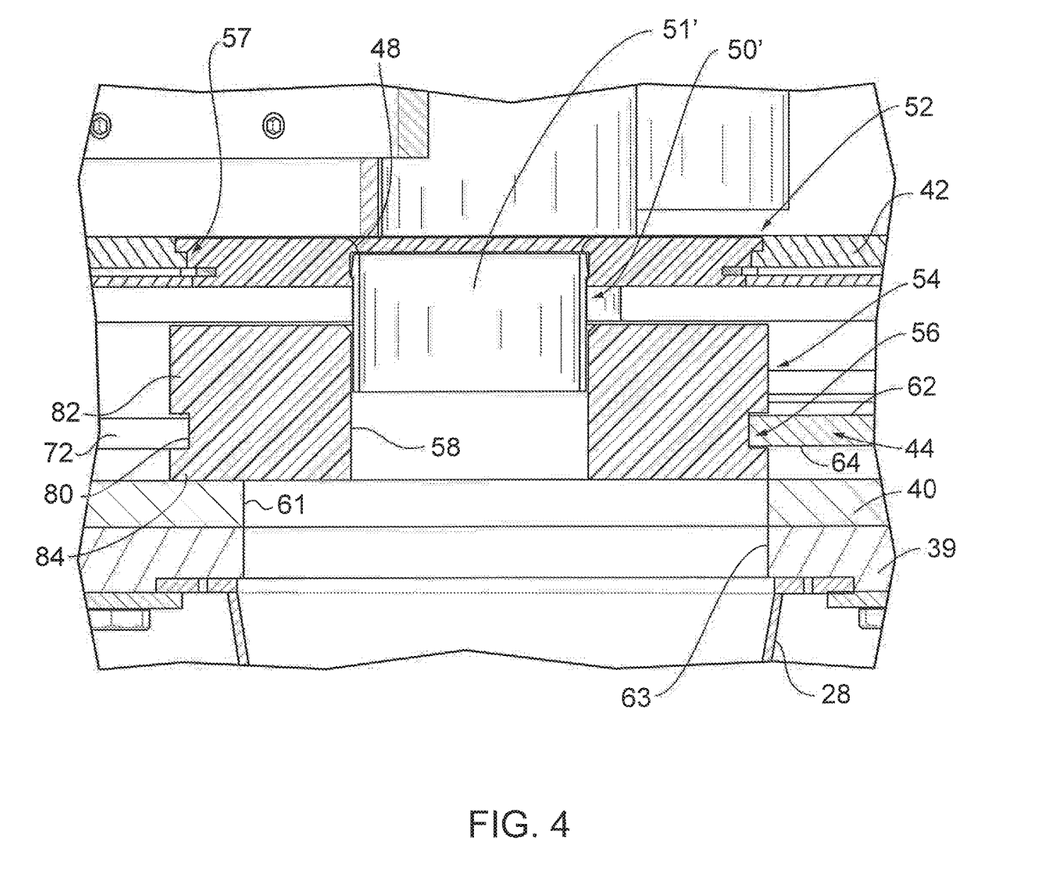
FIG. 4 is a sectional front elevation view of an alternative version of the assembly of FIG. 3.
Figure 5:
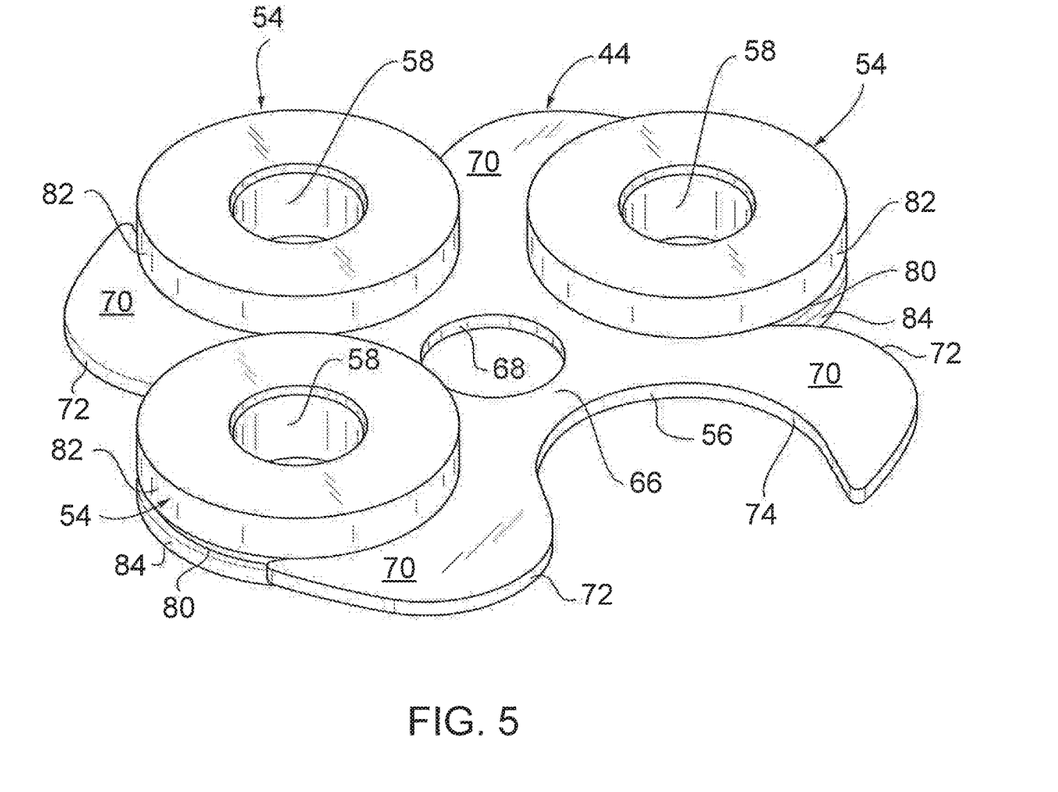
FIG. 5 is a perspective view of the bottom cup holder plate and several bottom cup holders of the assembly of FIGS. 1-3.
Figure 6:
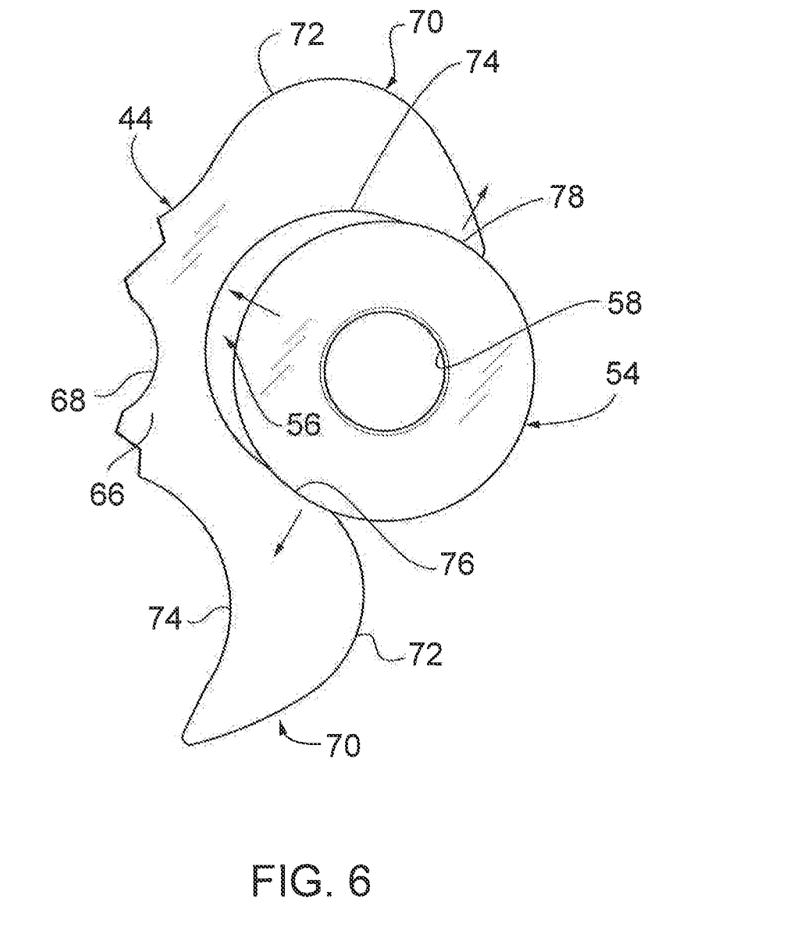
FIG. 6 is a fragmentary top plan view of a portion of the bottom cup holder assembly of FIGS. 1-3 and 5, showing insertion of a bottom cup holder into an associated receptacle in the bottom cup holder plate.
Figure 7:
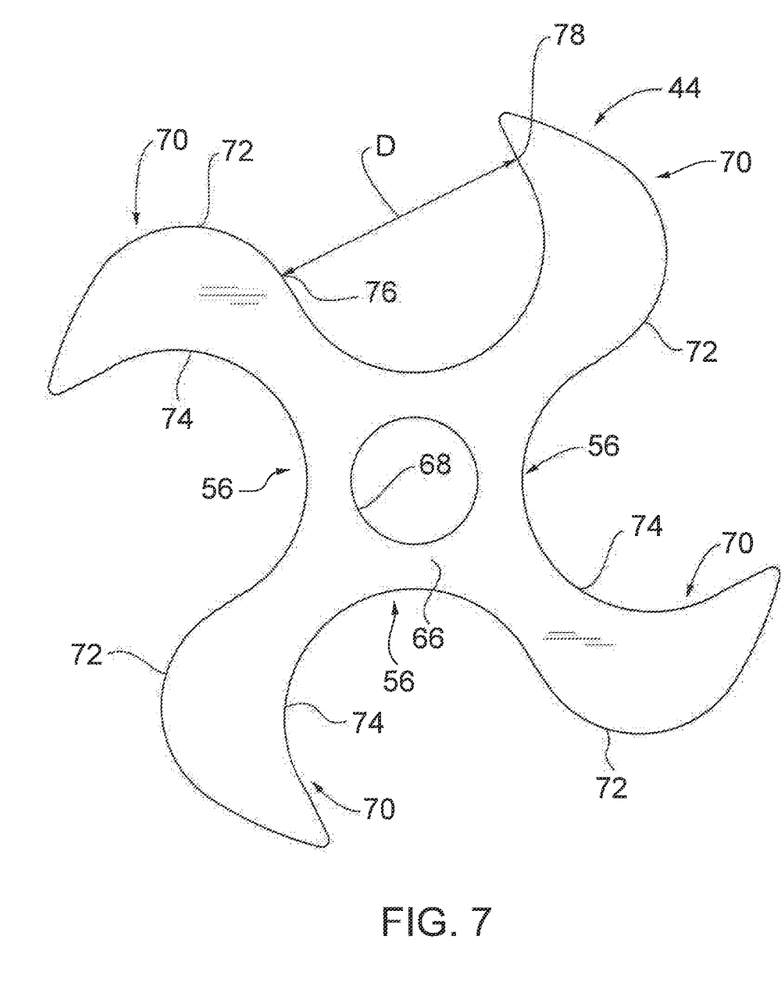
FIGS. 7 and 8 are bottom plan and side elevation views, respectively, of the bottom cup holder plate of the assembly FIGS. 5 and 6.
Figure 8:
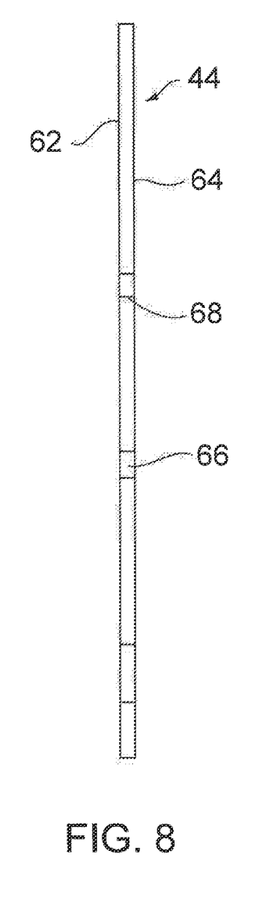

Turning now to FIG. 1-3, each cup 50 of this embodiment is retained in place by a top cup holder 52 retained in a corresponding receptacle 48 in the top cup holder plate 42 and a bottom cup holder 54 retained in a corresponding receptacle 56 in the bottom cup holder plate 44. The bottom cup holder 54 also slideably supports the bottom cup holder plate 44 on the wear plate 40 as discussed below. The cup 50 of this embodiment has a top cup section 51 retained in the top cup holder 52 and extending downwardly from the top cup holder 52, a bottom cup section 60 retained in a central bore 58 in the bottom cup holder 54 and extending upwardly from the top of the bottom cup holder 54, and a central section 53 extending between top and bottom sections 51 and 60 (the central section 53 being omitted from FIGS. 2 and 3). In an alternative embodiment, shown in FIG. 4, the cup 50' includes a top section 51' that extends partway into the bore 58 in the bottom cup holder 54. The top section 51' and the portion of the bore 58 located beneath the bottom of the top section 51' thus collectively form the cup 50' in this embodiment. In either embodiment, the cup 50 or 50' conceptually extends from the bottom of the bottom cup holder plate 44 to the top of the top cup holder plate 42.

Turning now to FIGS. 1-4, in operation, the turret 30 is driven to rotate relative to the wear plate 40, the feed hopper 26, and the dispensing funnel 28 via operation of the motor 24 and the drum shaft 46. During this rotation, materials are dispensed from the feed hopper 26, through a then-underlying opening 48 in the top cup holder 52, and into the underlying cup 50. The thus-filled cup 50 is then rotated to the opposite side of the rotary cup filler 20 to a position in which the associated opening 56 in the bottom cup holder 54 is aligned with the opening 61 in the wear plate 40 and the opening 63 in the support plate 39 (FIGS. 3 and 4), whereupon materials are discharged from the cup 50 and into the dispensing funnel 28 and then into an underlying package or container. The now-empty cup 50 then rotates back around into receiving orientation beneath the bottom of the feed hopper 26. This process is repeated on a continuous or intermittent cycle for each of the cups 50.

Turning now to FIGS. 3-11, and initially to FIGS. 3 and 4, the bottom cup holders 54 and the bottom cup holder plate 44 of this embodiment are configured to permit the bottom cup holders 54 to be snapped into or otherwise releasably retained in open-ended receptacles 56 opening into the sides of the bottom cup holder plate 44. In the illustrated embodiment, a groove 80 in each bottom cup holder 54 fits into a receptacle 56 in the bottom cup holder plate 44 as detailed below.

Referring now to FIGS. 5-8, the bottom cup holder plate 44 is a flat metal plate having planar upper end lower surfaces 62 and 64 (FIG. 8), a central hub 66 with an opening 68 for receiving the driven shaft 46, and a plurality of arms 70 extending outwardly from the hub 66. The arms 70 extend arcuately. In the illustrated embodiment, the arms 70 extend in a generally spiral fashion that curves or swoops in the direction of turret rotation for reasons described below. The diameter of the hub 66 and the number, size, and shapes of the arms 70, as well as the number, size, and placement of the receptacles 56 formed between the arms 70, will depend upon factors including the number and diameter of bottom cup holders 54 to be supported in the bottom cup holder plate 44. Generally speaking, regardless of the specific application, each arm 70 has leading and trailing edges 72 and 74 forming portions of two adjacent receptacles 56. Hence, each receptacle 56 is formed between the leading edge 72 of one arm 70 and the trailing edge 74 of an adjacent arm 70.

The bottom cup holder plate 44 is formed from a durable material having some resiliency so as to permit the snap fitting or at least interference fitting of the bottom cup holders 54 in the receptacles 56. However, a looser fit will also suffice so long as the bottom cup holders 54 are retained in the receptacles 56 sufficiently securely to remain in place during normal operation of the cup filler 20. In some applications, it may be desirable to form the bottom cup holder plate 44 from a food grade material that is easy to clean. The bottom cup holder plate 44 also should be strong enough to securely hold the bottom cup holders 54 in place and heavy enough to press the bottoms of the bottom cup holders 54 into sliding contact with the underlying wear plate 40. Stainless steel is a suitable material. Anodized aluminum also could be a suitable material, especially in applications in which the bottom cup holder plate 44 is sufficiently massive to be heavy enough to hold the bottom cup holders 54 in sliding engagement with the wear plate 40. The bottom cup holder plate 44 should be thick enough to provide adequate rigidity to prevent warping or binding in use. When stainless steel is employed as the material for the bottom cup holder plate 44, a thickness of 0.250" is acceptable.

The illustrated bottom cup holder plate 44 is configured to hold four bottom cup holders 54. The bottom cup holder plate 44 thus has four arms 70 forming four receptacles 56. The center of each receptacle is spaced 4.0" from the center of the bottom cup holder plate 44. The operative portion of each receptacle 56 (i.e., the portion of the receptacle 56 that engages the associated bottom cup holder 54 and extending between points 76 and 78 in FIG. 7) is essentially semi-circular in shape, having a diameter "D" (FIG. 7) of 4.373" in the illustrated embodiment. That diameter is slightly larger than the inner diameter of the mating portion of the bottom cup holder 54 which, in this embodiment, comprises a groove 80 as discussed below. The acceptable differential between these diameters could vary with a number of factors, including the resiliency of the bottom cup holder plate arms 70 and any resiliency of the bottom cup holders 54. Differentials on the order of 0.005" to 0.015", and more typically on the order of 0.010", are common. The radius of the operative portion of the receptacle is 1.92". Beyond the points 76 and 78 defining the edge of the semi-circle or the ends of the operative portion of the receptacle, each receptacle 56 flares outwardly at an angle of about 6-10° and, more typically, of about 8°, so the first point of contact between opposed surfaces of the bottom cup holder 54 and the arms 70 during insertion of the bottom cup holder 54 into the receptacle 56 is at the points 76 and 78 where the bottom cup holder 54 snaps in place. To achieve this effect, the curvature of the leading edge 72 of each arm 70 outboard of the end of the semi-circle progresses to a radius of 1.875", which is slightly larger than the radius of the bottom cup holder 54 so that the bottom cup holder does not bind during insertion. Beyond that location, the leading edge 72 of each arm 70 has a still higher curvature with a radius of about 6.345.

Figure 9:
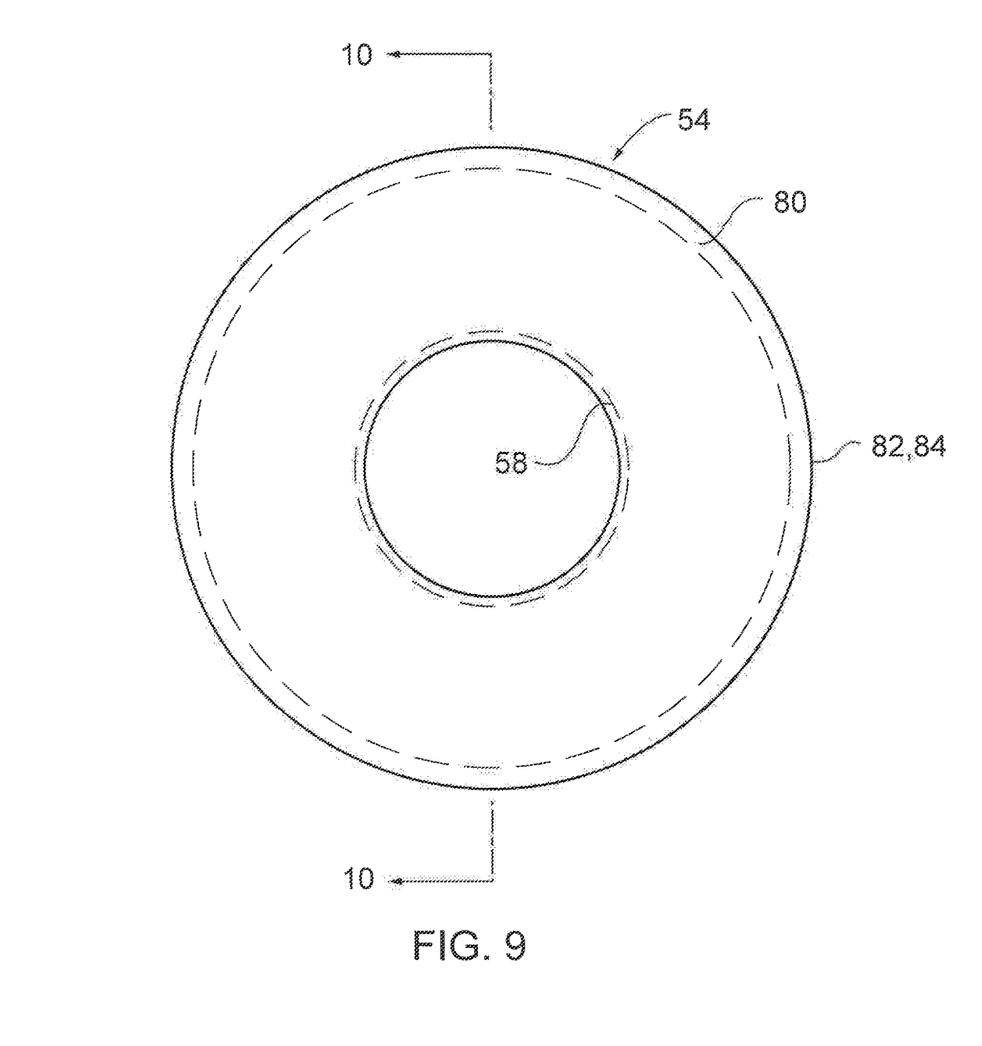
FIG. 9 is a top plan view of a bottom cup holder of the assembly of FIGS. 5 and 6.
Figure 10:
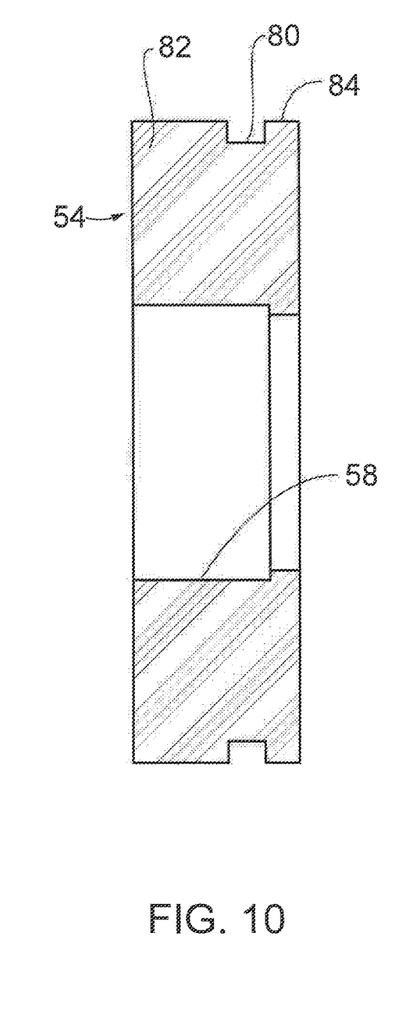
FIG. 10 is a sectional side elevation view of the bottom cup holder of FIG. 9, taken along the lines 10-10 of FIG. 9.

The bottom cup holder 54 may be formed from an abrasion-resistant, durable, and easy to clean material. Delrin® (Acetal Homopolymer) is acceptable. Cast or molded urethane, or even stainless steel, also could be used. Turning now to FIGS. 9 and 10, the bottom cup holder 54 comprises a one-piece cylindrical element having the central aperture 58 and the outer peripheral groove 80 formed therein. The central aperture 58 may receive the separate bottom cup section 60, as seen in FIGS. 1-3, where associated center cup section 51 is shown removed from FIGS. 2-3 or, in some embodiments, may itself conceptually define the bottom portion of a cup 50' that receives an upper cup section 51', as seen in FIG. 4. In either event, the outer groove 80 snap-fits into or otherwise is retained in a corresponding receptacle 56 in the bottom cup holder plate 44. The radial depth of the groove 80 of this embodiment is set to provide an inner groove diameter that is sufficient to provide the desired snap-fit or at least an interference fit into the receptacle 56 while leaving sufficient material outboard of the groove 80 to provide the necessary strength to retain the bottom cup holder 54 on the bottom cup holder plate 44. In the illustrated embodiment in which the inner diameter of the groove 80 is 4.380" and the outer diameter of the bottom cup holder 54 is 4.75", the groove 80 has a depth of 0.37". Depending on factors including the strength of the material of the bottom cup holder 54, the axial thickness of the bottom cup holder portions 82 and 84 above and below the groove 80, and the diameter of the bottom cup holder 54 as a whole, the groove depth could vary significantly from that value.

Figure 11:
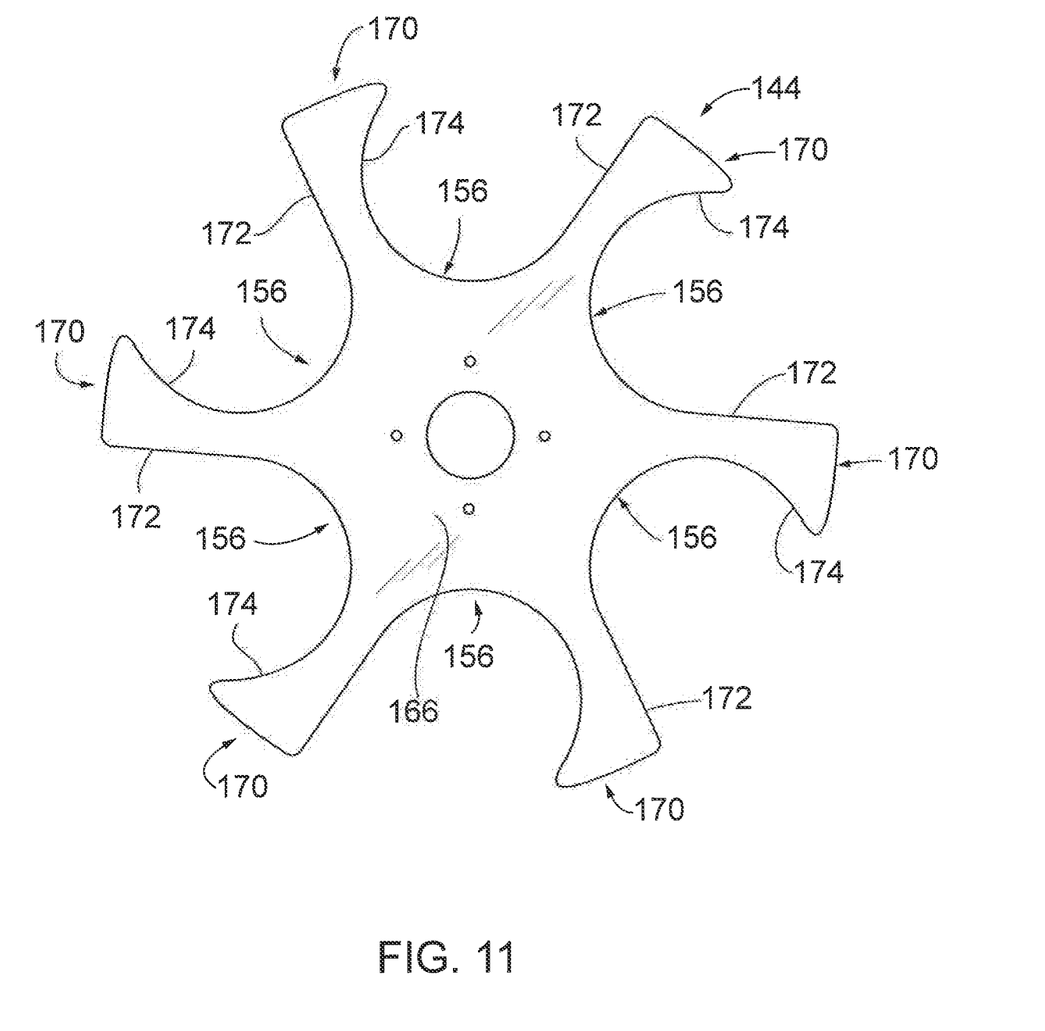
FIG. 11 is a top plan view of a bottom cup holder plate constructed in accordance with another embodiment of the present invention.

As mentioned above, cup holder plates constructed in accordance with the invention could take any of a number of configurations to accommodate different cup diameters and numbers of cups. Cup holder plates could be configured to accommodate any number of cups from two up to and beyond ten. Referring to FIG. 11, one such alternative bottom cup holder plate 144 is illustrated that has six open-ended receptacles 156 for retaining six cup holders. As in the previous embodiment, bottom cup holder plate 144 has an inner hub 166 and a number (in this case six) of outwardly extending arms 170, with a receptacle 156 being formed between the leading and trailing edges 172 and 174 of each set of adjacent arms 170. The shape, including the length, curvature, and spacing of the arms 170 of this embodiment, differs from that of the arms 70 of the first embodiment to provide receptacles of the size, shape, location, and spacing desired for that application.

Turning again to FIGS. 1-10, the rotary cup filler 20 is readied for operation by first inserting a bottom cup holder 54 into each of the receptacles 56 in the bottom cup holder plate 44. In each case, this insertion comprises aligning the groove 80 in the bottom cup holder 54 with a receptacle 56 in the bottom cup holder plate 44 and inserting the bottom cup holder 54 into the semi-circular inner portion of receptacle 56 from the side. During this process, the arm edges 72 and 74 bordering the opposed sides of the bottom cup holder 54 guides the bottom cup holder 54 into the receptacle 56. In the illustrated embodiment, the differential between the diameters of the inner surface of the groove 80 and the receptacle 56 at the line D in FIG. 7 results in a snap-fit or interference fit of the bottom cup holder 54 in the receptacle 56 during this insertion process, securely retaining the bottom cup holder 54 in the receptacle 56. This insertion process could be performed before the bottom cup holder plate 44 is installed in the rotary cup filler 20 or, if the bottom cup holder plate 44 already has been installed in the rotary cup filler 20, simply by lifting the bottom cup holder plate 44 above the wear plate 40 by a distance that is greater than thickness of the bottom portion 84 of the bottom cup holder 54. In the illustrated embodiment, this distance is only 0.25", which is an order of magnitude less than that which is required to provide the clearance necessary to insert prior cup holders into apertures in a bottom cup holder plate from below.

Once the bottom cup holders 54 are inserted into the receptacles 56 and the bottom cup holder plate 44 is attached to the shaft 46, the upper portions 60 of the cups 50 are mounted in the openings 57 in the upper cup holder plate 42 in the standard manner. The turret 30 is then driven to rotate via operation of the shaft 46 so that the upper and lower cup holder plates 42 and 44 rotate in unison. The weight of the bottom cup holder plate 44 presses the bottom surfaces of the bottom cup holders 54 into contact with the wear plate 40 sufficiently to prevent bouncing of the bottom cup holders 54 as they slide along the wear plate 40. Each cup 50 is filled with materials as it rotates beneath the feed hopper 26 and thereafter is conveyed to the opposite side of the cup filler 20, where the open bottom of the cup 50 is aligned with the aperture 61 in the wear plate 40 and the opening 63 in the support plate 39 as seen in FIGS. 3 and 4. At that time, the materials in the cup 50 are discharged through the apertures 61 and 63, through the underlying dispensing funnel 28, and into an underlying package or container. The now-empty cup 50 is then driven back to the opposite side of the rotary cup filler 20, where the process is repeated. During this operation, centrifugal and frictional forces, generated by the rotating motion of the bottom cup holder plate 44 enhanced by the curvature of the arms, assist in retaining the bottom cup holders 54 in the receptacles 56 due to the forward-facing orientation of the receptacles 56 achieved by the generally-spiral shaped curved arms 70.

In order to replace worn or damaged cup holders, or in order to replace cup holders with cup holders having different inner diameters configured to receive different diameter cups, one only need to lift the bottom cup holder plate 44 at least 0.25" and pull the bottom cup holders 54 outwardly from the open ends of the receptacles 56, insert new cup holders in the receptacles 56, and lower the bottom cup holder plate 44 back to a position in which the bottom cup holders 54 rest on the wear plate 40. This is in sharp contrast to prior designs, in which it would have been necessary to remove retaining rings from upper grooves in the bottom cup holders, then lift the bottom cup holder plate several inches or more, then remove the bottom cup holders from the apertures in the bottom cup holder plate from below, and then repeat the process. Far fewer parts therefore are required, and initial installation and replacement are considerably simplified. In addition, there are fewer critical dimensions on the bottom cup holder. As a practical matter, only the dimensions and location of the groove 80 are important. In prior cup holders, the dimensions and locations of the upper groove were critical.

Variations and modifications of the foregoing are within the scope of the present invention. For example, open-ended receptacles of the type disclosed herein could be provided in the top cup holder plate instead of or in addition to the bottom cup holder plate. Cup holder plates and the associated cup holders also could be used with a wide variety of rotary cup fillers other than the specific machine disclosed herein. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A rotary cup filler configured to fill cups of a designated volumetric capacity with materials and to discharge the materials from the cups, the rotary cup filler comprising:
   a frame;
   a driven shaft supported on the frame;
   a cup holder plate supported by the frame and comprising a central hub that surrounds the driven shaft and a plurality of aims that extend arcuately from the central hub to form open-ended receptacles therebetween;
   a plurality of cup holders, each of which is retained in a corresponding one of the open-ended receptacles in the cup holder plate; and
   a drive motor supported by the frame and configured to drive the driven shaft and the cup holder plate to rotate.

2. The rotary cup filler of claim 1, wherein the aims of the cup holder plate sweep in a direction of cup holder plate rotation so that forces imposed on the cup holders during cup holder plate rotation tend to retain the cup holders in the open-ended receptacles.

3. The rotary cup filler of claim 1, wherein each open-ended receptacle is configured to engage a mating portion of the cup holder in one of an interference fit manner and a snap-fit manner.

4. The rotary cup filler of claim 1, wherein the aims forming each open-ended receptacle engage opposed sides of a circumferential groove in an associated cup holder.

5. The rotary cup filler of claim 1, wherein a diameter of each open-ended receptacle is larger than an inner diameter of a mating portion of the cup holder by 0.005" to 0.015".

6. The rotary cup filler of claim 1, further comprising a wear plate disposed beneath the cup holder plate, and wherein the cup holders extend beneath a bottom surface of the cup holder plate and support the cup holder plate on the wear plate.

7. The rotary cup filler of claim 1, wherein the cup holder plate comprises a bottom cup holder plate and the cup holder comprise bottom cup holders, and further comprising
    an upper cup holder plate located above the bottom cup holder plate, the upper cup holder plate being supported by the frame and having a central hub that surrounds the driven shaft and having a plurality of receptacles, and
    a plurality of upper cup holders, each of which is retained in a corresponding receptacle in the upper cup holder plate.

8. A rotary cup filler configured to fill cups with materials and to discharge the materials from the cups, the rotary cup filler comprising:
    a frame;
    a cup holder plate supported by the frame and comprising a central portion and a plurality of arms that extend arcuately from the central portion to form open-ended receptacles therebetween;
    a plurality of cup holders, each of which is retained in a corresponding one of the open-ended receptacles in the cup holder plate; and
    a drive motor supported by the frame and configured to drive the cup holder plate to rotate about the central portion thereof.

9. The rotary cup filler of claim 8, further comprising a driven shaft that is supported on the frame and that is driven to rotate by the drive motor, the driven shaft being connected to a hub forming the central portion of the cup holder plate.

10. The rotary cup filler of claim 8, wherein the aims of the cup holder plate sweep in a direction of cup holder plate rotation so that forces imposed on the cup holders during cup holder plate rotation tend to retain the cup holders in the open-ended receptacles.

11. The rotary cup filler of claim 8, wherein each open-ended receptacle is configured to engage a mating portion of the cup holder in one of an interference fit manner and a snap-fit manner.

12. The rotary cup filler of claim 8, wherein the aims forming each open-ended receptacle engage opposed sides of a circumferential groove in an associated cup holder.

13. The rotary cup filler of claim 8, wherein each open-ended receptacle is formed in a space between a pair of adjacent arms and flares outwardly at an angle of about 6-10 degrees.

14. The rotary cup filler of claim 8, wherein an inner portion of each open-ended receptacle that is configured to receive a cup holder is semi-circular in shape.

15. The rotary cup filler of claim 8, wherein the cup holder plate comprises a flat metal plate having at least generally planar upper and lower surfaces.

16. The rotary cup filler of claim 8, further comprising a wear plate disposed beneath the cup holder plate, and wherein the cup holders extend beneath a bottom surface of the cup holder plate and support the cup holder plate on the wear plate.

17. The rotary cup filler of claim 8, wherein the cup holder plate comprises a bottom cup holder plate and the cup holder comprise bottom cup holders, and further comprising
    an upper cup holder plate located above the bottom cup holder plate, the upper cup holder plate being supported by the frame and having a central hub that surrounds the driven shaft and having a plurality of receptacles, and
    a plurality of upper cup holders, each of which is retained in a corresponding receptacle in the upper cup holder plate.

18. A rotary cup filler configured to fill cups of a designated volumetric capacity with materials and to discharge the materials from the cups, the rotary cup filler comprising:
    a frame;
    a driven shaft supported on the frame;
    a lower cup holder plate supported by the frame and comprising a central hub that surrounds the driven shaft and a plurality of aims that extend arcuately from the central hub to form open-ended receptacles therebetween;
    a plurality of lower cup holders, each of which is retained in a corresponding one of the open-ended receptacles in lower the cup holder plate;
    a wear plate disposed beneath the lower cup holder plate, wherein the lower cup holders extend beneath a bottom surface of the lower cup holder plate and support the lower cup holder plate on the wear plate;
    an upper cup holder plate located above the lower cup holder plate, the upper cup holder plate having a central hub surrounding the driven shaft and having a plurality of circumferentially spaced receptacles;
    a plurality of upper cup holders, each of which is retained in a corresponding one of the receptacles in the upper cup holder plate; and
    a drive motor supported by the frame and configured to drive the driven shaft and the upper and lower cup holder plates to rotate.

* * * * *